United States Patent
Feng

(10) Patent No.: US 7,145,918 B2
(45) Date of Patent: Dec. 5, 2006

(54) BANDWIDTH CONTROL METHOD AND DEVICE FOR NETWORK SWITCH

(75) Inventor: Jung-You Feng, Hsinchu (TW)

(73) Assignee: F 3 Incorporation (TW)

( * ) Notice: Subject to any disclaimer, the term of this patent is extended or adjusted under 35 U.S.C. 154(b) by 1019 days.

(21) Appl. No.: 10/072,938

(22) Filed: Feb. 12, 2002

(65) Prior Publication Data

US 2003/0152101 A1  Aug. 14, 2003

(51) Int. Cl.
*H04J 3/16* (2006.01)
*H04L 12/28* (2006.01)

(52) U.S. Cl. .................. 370/468; 370/389; 370/395.2; 370/470

(58) Field of Classification Search ................ 370/230, 370/231, 235, 389, 410, 412, 468, 396, 470, 370/395.2, 400, 351, 391, 392, 395.41, 395.5
See application file for complete search history.

(56) References Cited

U.S. PATENT DOCUMENTS

| | | | |
|---|---|---|---|
| 6,538,994 B1 * | 3/2003 | Horspool et al. ........... 370/230 |
| 6,681,059 B1 * | 1/2004 | Thompson .................. 382/298 |
| 6,788,697 B1 * | 9/2004 | Aweya et al. ............... 370/412 |
| 6,868,062 B1 * | 3/2005 | Yadav et al. ................ 370/234 |

\* cited by examiner

*Primary Examiner*—Hanh Nguyen
(74) *Attorney, Agent, or Firm*—Bacon & Thomas PLLC

(57) ABSTRACT

A bandwidth control method and a bandwidth control device for a network switch are disclosed. When a client port has a packet to be transmitted, the average traffic rate $Tr[n+1]$ of the client port generated before the time slot $n+1$ is determined by $Tr[n+1]=g*Tr\Delta[n]+(1-g)*Tr[n]$, where $g<1$, $Tr\Delta[n]$ is the traffic rate of the client port in time slot $n$, and $Tr[n]$ is an actual average traffic rate generated before time slot $n$. Only when $Tr[n+1]$ is smaller than the bandwidth threshold $Tr\_pre$ of the client port, the packet is allowed to be transmitted.

11 Claims, 4 Drawing Sheets

BANDWIDTH CONTROL METHOD AND DEVICE FOR NETWORK SWITCH

BACKGROUND OF THE INVENTION

1. Field of the Invention

The present invention relates to a network switch, and more particularly to a bandwidth control method and a bandwidth control device for a network switch.

2. Description of Related Art

With the development of the communication technology, people can access plentiful resources in networks by various network devices. For example, users of an Ethernet can make a connection to an uplink fast Ethernet through a network switch so as to access the Internet.

FIG. 1 shows the arrangement of a conventional network switch 11. Each client port 111 of the network switch 11 is connected to a 10Base-T Ethernet, and the uplink port 112 is connected to a 100Base-T fast Ethernet. The user of the 10Base-T Ethernet can thus get on the 100Base-T fast Ethernet for acquiring the resources of Internet via the network switch 11.

The aforementioned network switch 11 only provides the switching function. Therefore, the bandwidth allocated for the Ethernet users in each client port 111 is constant. However, as the Internet is getting more and more popular, the requirement for accessing to networks is increased rapidly. Currently, the commercially available network deices, at the last mile of the network connection, for connecting to Internet are XDSL, cable modem, and Ethernet, wherein the Ethernet is favorable due to its advantages of low cost and high compatibility. When an ISP uses an Ethernet as an accessing device of Internet, since the minimum bandwidth of the Ethernet is 10 Mb/sec, the backbone network may suffer from congestion, if many users access to the Internet and the bandwidth of the Ethernet cannot be restricted. Furthermore, from the viewpoint of the ISP, it is necessary to classify the users for charging the users based on different classifications. By controlling the bandwidth, it is able to assign different speeds for connecting to the network, thereby achieving the purpose of charging by classification. Therefore, when Ethernet is commonly used as an accessing device of the Internet, the requirement of bandwidth control will be important. However, as mentioned above, the bandwidth of Ethernet is typically fixed. Many manufacturers use high layer protocols (layer 3 or layer 4) to solve the problem of bandwidth control. Unfortunately, this will greatly increase the cost of Ethernet device, and thus degrade its competition ability. Consequently, it is desired for the above conventional network switch to be improved to mitigate and/or obviate the aforementioned problems

SUMMARY OF THE INVENTION

The object of the present invention is to provide a bandwidth control method and a bandwidth control device for a network switch, which can precisely control the bandwidth control of each client port at a low cost without using high layer protocols.

In accordance with one aspect of the present invention, there is provided a bandwidth control device for a network switch having a plurality of client ports and at least one uplink port to switch packets among the client ports and the uplink port, each client port having a predefined bandwidth threshold. The bandwidth control device includes: a first multiplier for multiplying a traffic rate $Tr\Delta[n]$ of a client port in a time slot n by a first multiplicator g (g<1), where the time slot n is defined as a time interval from time $t_n$ to $t_{n+1}$, and the traffic rate represents length of transmitted packets; a second multiplier for multiplying an average traffic rate $Tr[n]$ of the client port actually generated before time slot n and stored in the register 34 by a second multiplicator 1−g; an adder for adding outputs from the first multiplier and the second multiplier, so as to obtain an average traffic rate of the client port before time slot n+1 as $Tr[n+1]=g*Tr\Delta[n]+(1-g)*Tr[n]$; the register provided for temporarily storing the average traffic rate $Tr[n+1]$ of the client port generated before time slot n+1; and a comparator for comparing the average traffic rate $Tr[n+1]$ of the client port generated before time slot n+1 and a bandwidth threshold $Tr\_pre$ of the client port, and if $Tr[n+1]$ is less than $Tr\_pre$, the client port being allowed to transmit packets.

In accordance with another aspect of the present invention, there is provided a bandwidth control method, which includes the steps of: (A) initializing a traffic rate $Tr\Delta[n]$ of a client port in time time slot n to 0, where the time slot n is defined as a time interval from time $t_n$ to $t_{n+1}$, and the traffic rate represents length of transmitted packets; (B) determining whether there is a packet to be transmitted, and if yes, calculating an average traffic rate of the client port generated before time slot n+1 as $Tr[n+1]=g*Tr\Delta[n]+(1-g)*Tr[n]$, where g<1 and $Tr[n]$ is an average traffic rate actually generated before time slot n; (C) determining whether the average traffic rate $Tr[n+1]$ of the client port generated before time slot n+1 is larger than a bandwidth threshold $Tr\_pre$ of the client port, and if no, transmitting the packet; and (D) updating the traffic rate $Tr\Delta[n]$ in time slot n as $Tr\Delta[n]=Tr\Delta[n]+$ packet length, updating the average traffic rate $Tr[n+1]$ generated before time slot n+1 as $Tr[n+1]=g*Tr\Delta[n]+(1-g)*Tr[n]$, determining whether to enter into a next time slot, and if no, executing step (B).

The various objects and advantages of the present invention will be more readily understood from the following detailed description when read in conjunction with the appended drawing.

DETAILED DESCRIPTION OF THE PREFERRED EMBODIMENTS

There will now be described a preferred embodiment of this invention with reference to FIG. 2 to FIG. 5.

Figure 1:
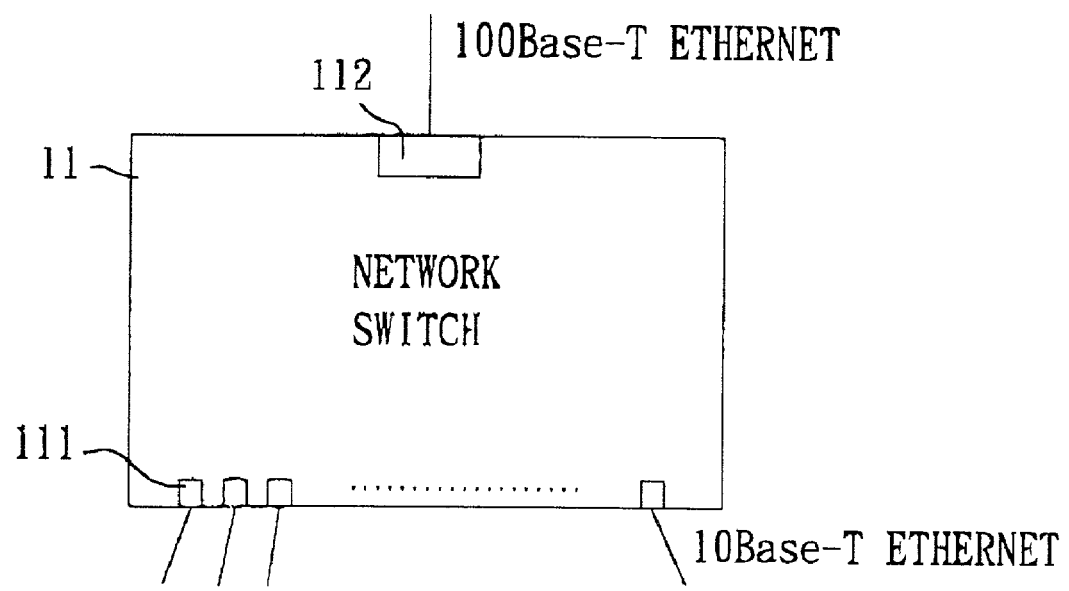
FIG. 1 shows the arrangement of a conventional network switch.
Figure 2:
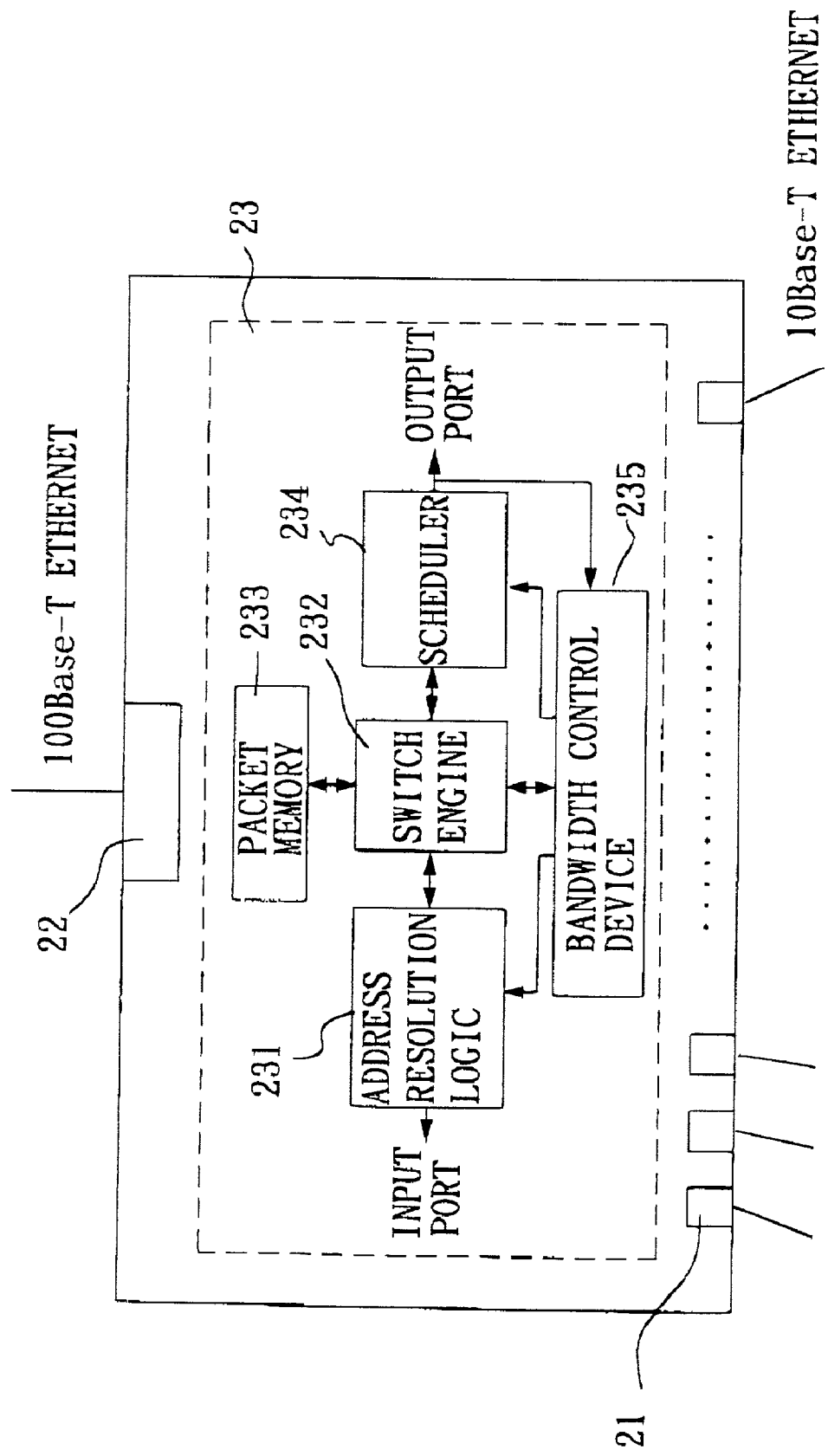
FIG. 2 shows the structure of a network switch in accordance with the present invention.

FIG. 2 shows the structure of a network switch, which includes a plurality of client ports 21, at least one uplink port 22 and a switching device 23. The uplink port 22 is connected to a fast network, such as a 100Base-T or a 1000Base-T Ethernet. Each client port 21 is connected to a general local area network, for example a 10Base-T Ethernet, or a 100Base-T Ethernet. Each client port 21 is provided with a predefined bandwidth threshold.

The switching device 23 includes an address resolution logic 231, an switching engine 232, a packet memory 233, a scheduler 234, and a bandwidth control device 235. The packet enters into the network switch via an input port which may be a client port 21 or the uplink port 22. The address resolution logic 231 determines the destination address of the packet, and thus the switch engine 232 in turn switches the output to a client port 21 or the uplink port 22 which is used as an output port. The packet memory 233 has a queue data structure for temporarily storing the packets to be outputted. The scheduler 234 is provided to sort the packets for output. The bandwidth control device 235 is provided to control the bandwidth allocation of the network switch.

Figure 3:
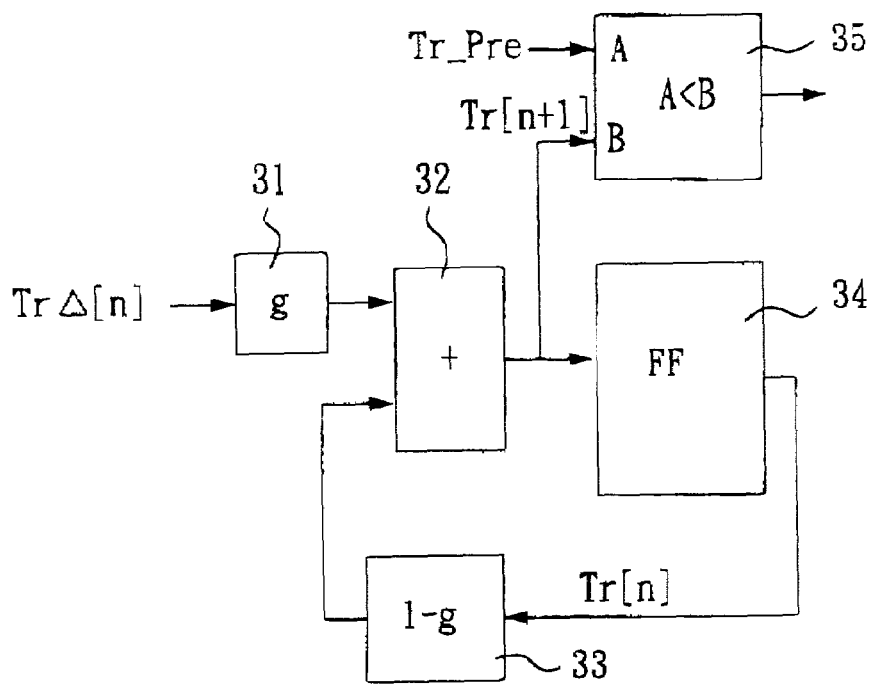
FIG. 3 shows the structure of the bandwidth control device in accordance with the present invention.

FIG. 3 shows the structure of the bandwidth control device 235, which includes a first multiplier 31, an adder 32, a second multiplier 33, a register 34, and a comparator 35. The first multiplier 31 and the second multiplier 33 have multiplicators g and 1−g, respectively, where g<1. The register 34 is preferred to be a flip-flop.

Figure 4:
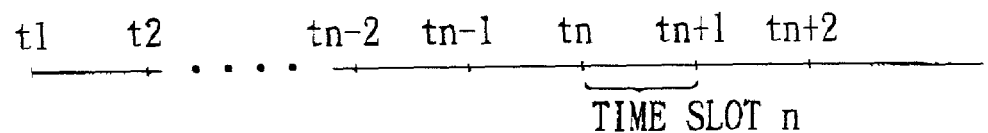
FIG. 4 schematically illustrates the definition of a time slot.

The bandwidth control device 235 controls the bandwidth allocation based on the predefined bandwidth threshold in the client port 21, the length of the packet to be transmitted, and the bandwidth used previously. To describe the operating method of the bandwidth control device 235, time is divided into a sequence of time slots, as shown in FIG. 4, and a time slot n is defined as the time interval from $t_n$ to $t_{n+1}$. The traffic rate of a specific client port 21 in time slot n is denoted by $Tr\Delta[n]$, wherein traffic rate represents the length of transmitted packets. The average traffic rate generated before time slot n, i.e., the actual traffic rate generated from $t_1$ to $t_n$, is denoted by $Tr[n]$. The bandwidth threshold of the client port 21 is denoted by Tr_pre. Also with reference to FIG. 3, for the client port 21 at time slot n, the first multiplier 31 multiplies the traffic rate of time slot n ($Tr\Delta[n]$) by the multiplicator g. The second multiplier 33 multiplies the average traffic rate generated before time slot n ($Tr[n]$), which is stored in the register 34, by the multiplicator 1−g. The adder 32 then adds the outputs of the first and second multiplier 31 and 33, thereby obtaining the average traffic rate generated before time slot n+1 ($Tr[n+1]$) as follows:

$$Tr[n+1]=g*Tr\Delta[n]+(1-g)*Tr[n].$$

This output Tr[n+1] is stored in the register 34. The comparator 35 compares the average traffic rate generated before time slot n+1 (Tr[n+1]) and the bandwidth threshold Tr_pre. If Tr[n+1] is smaller than Tr_pre, the client port 21 is allowed to transmit packets; otherwise, it must wait for transmitting.

Figure 5:
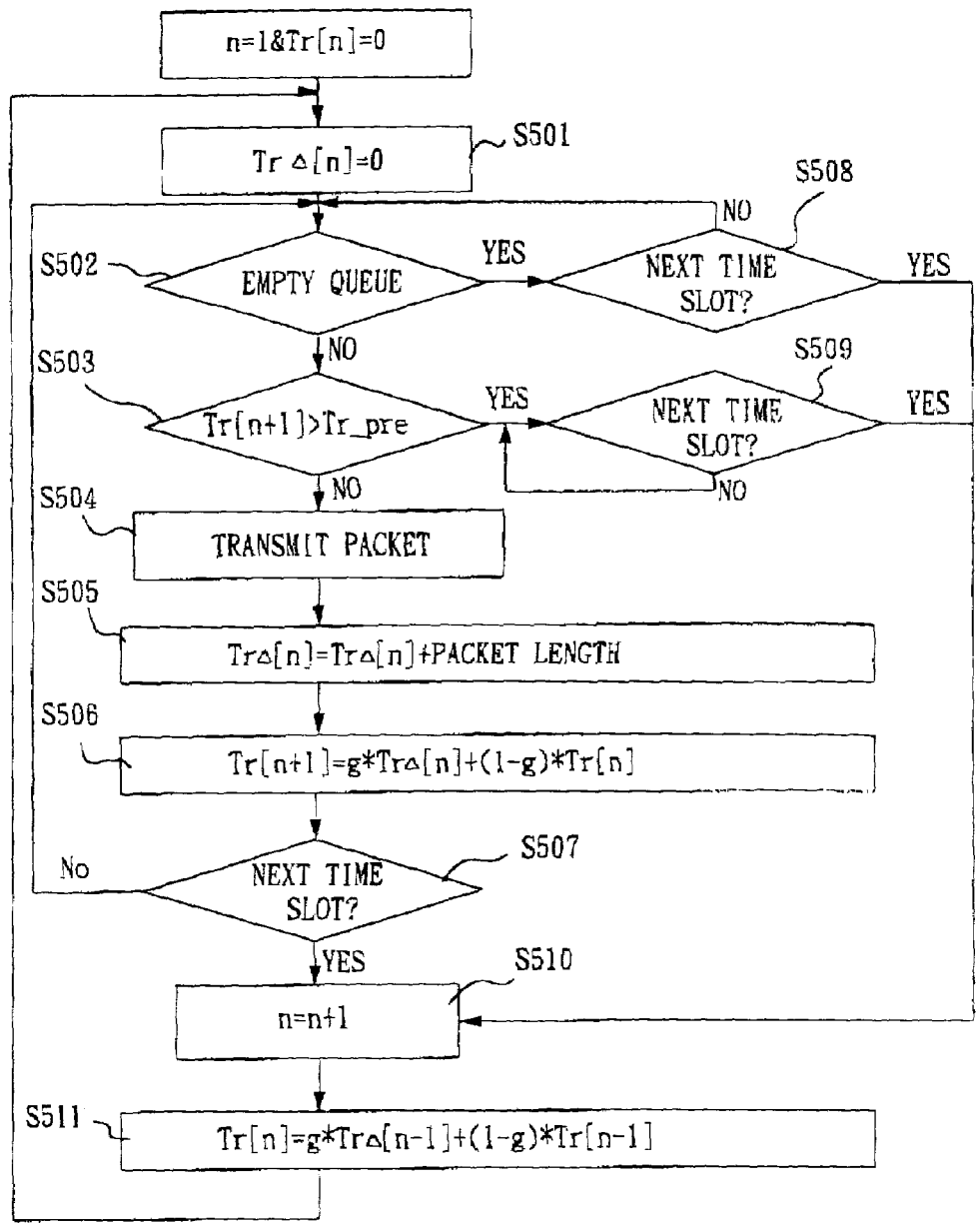
FIG. 5 is the flowchart of the bandwidth control method in accordance with the present invention.

With reference to FIG. 5, the flowchart of the bandwidth control method in accordance with the present invention is illustrated. At first, in a time slot n, the $Tr\Delta[n]$ is initialized to 0 (step S501). In step S502, it is determined whether the queue is empty. If yes, it is determined whether to enter into the next time slot (step S508). If no, the step S502 is executed again. If the result of step S502 is 'no', it indicates that the queue has packets to be transmitted. Therefore, in step S503, it is determined whether the average traffic rate genrerated before time slot n+1 (Tr[n+1]) is larger than the bandwidth threshold Tr_pre. If yes, it is determined whether to enter into the next time slot (step S509) to wait for processing in the next time slot. If step S503 determines that the average traffic rate before the time slot n+1 (Tr[n+1]) is less than the bandwidth threshold Tr_pre, the packets can be transmitted (step S504). The traffic rate of time slot n ($Tr\Delta[n]$) is updated as: $Tr\Delta[n]=Tr\Delta[n]+packet\_length$ (step S505), and the average traffic rate before time slot n+1 (Tr[n+1]) is updated as: $Tr[n+1]=g*Tr\Delta[n]+(1-g)*Tr[n]$ (step S506). Then, it is determined whether to enter into the next time slot (step S507). If no, step S502 is executed. If step S507, S508, or S509 determines to enter into the next time slot, we have; n=n+1 (step S510) and the average traffic rate generated before time slot n is rewritten as: $Tr[n]=g*Tr\Delta[n-1]+(1-g)*Tr[n-1]$ for being used in a new time slot (step S510).

In view of the foregoing, it is known that each client port can determine whether to transmit based on the length of the packet to be transmitted and the traffic rate used previously. Only when the bandwidth determined by the current packet length and the traffic rate used previously is smaller than the bandwidth threshold, the packet can be transmitted. Therefore, no high layer protocol is required, and the bandwidth of each client port can be precisely controlled at a low cost.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A bandwidth control device for a network switch having a plurality of client ports and at least one uplink port to switch packets among the client ports and the uplink port, each client port having a predefined bandwidth threshold, the bandwidth control device comprising:
   a first multiplier for multiplying a traffic rate $Tr\Delta[n]$ of a client port in a time slot n by a first multiplicator g (g<1), where the time slot n is defined as a time interval from time $t_n$ to $t_{n+1}$, and the traffic rate represents length of transmitted packets;
   a second multiplier for multiplying an average traffic rate Tr[n] of the client port actually generated before time slot n and stored in a register by a second multiplicator 1−g;
   an adder for adding outputs from the first multiplier and the second multiplier, so as to obtain an average traffic rate of the client port before time slot n+1 as $Tr[n+1]=g*Tr\Delta[n]+(1-g)*Tr[n]$;
   the register provided for temporarily storing the average traffic rate Tr[n+1] of the client port generated before time slot n+1; and
   a comparator for comparing the average traffic rate Tr[n+1] of the client port generated before time slot n+1 and a bandwidth threshold Tr_pre of the client port, and if Tr[n+1] is smaller than Tr_pre, the client port being allowed to transmit packets.

2. The bandwidth control device as claim in claim 1, wherein the register is a flip-flop.

3. The bandwidth control device as claim in claim 1, wherein, after being compared by the comparator, if Tr[n+1] is larger than Tr_pre, the packet uncapable of being transmitted is stored in a packet memory of the network switch.

4. The bandwidth control device as claim in claim 1, wherein the client's port is connected to a 10Base-T or a 100Base-T Ethernet.

5. The bandwidth control device as claim in claim 1, wherein the uplink port is connected to a 100Base-T or a 1000Base-T-Ethernet.

6. A bandwidth control method for a network switch having a plurality of client ports and at least one uplink port to switch packets among the client ports and the uplink port, each client port having a predefined bandwidth threshold, the method comprising the steps of:

(A) setting a traffic rate $Tr\Delta[n]$ of a client port in time slot n to 0 for initialization, where the time slot n is defined as a time interval from time $t_n$ to $t_{n+1}$, and the traffic rate represents length of transmitted-packets;

(B) determining whether there is a packet to be transmitted, and if yes, calculating an average traffic rate of the client port generated before time slot n+1 as $Tr[n+1]=g*Tr\Delta[n]+(1-g)*Tr[n]$, where $g<1$ and $Tr[n]$ is an average traffic rate actually generated before time slot n;

(C) determining whether the average traffic rate $Tr[n+1]$ of the client port generated before time slot n+1 is larger than a bandwidth threshold $Tr\_pre$ of the client port, and if no, transmitting the packet; and (D) updating the traffic rate $Tr\Delta[n]$ in time slot n as $Tr\Delta[n]=Tr\Delta[n]+$ packet length, updating the average traffic rate $Tr[n+1]$ generated before time slot n+1 as $Tr[n+1]=g*Tr\Delta[n]+(1-g)*Tr[n]$, determining whether to enter into a next time slot, and if no, executing step (B).

7. The bandwidth control method as claim in claim 6, wherein in step (D), when entering into the next time slot, there are performed $n=n+1$ and $Tr[n]=g*Tr\Delta[n-1]+(1-g)*Tr[n-1]$, and then step (A) is executed.

8. The bandwidth control method as claim in claim 6, wherein in step (B), if there is no packet to be transmitted, it is determined whether to enter into a next time slot, and if no, step (B) is executed.

9. The bandwidth control method as claim in claim 7, wherein, when entering into the next time slot, there are performed $n=n+1$ and $Tr[n]=g*Tr\Delta[n-1]+(1-g)*Tr[n-1]$, and then step (A) is executed.

10. The bandwidth control method as claim in claim 1, wherein in step (C), if the average traffic rate $Tr[n+1]$ generated before time slot n+1 is larger than a bandwidth threshold $Tr\_pre$ of the client port, it is determined whether to enter into a next time slot, and if no, it waits for the next time slot.

11. The bandwidth control method as claim in claim 9, wherein, when entering into the next time slot, there are performed $n=n+1$ and $Tr[n]=g*Tr\Delta[n-1]+(1-g)*Tr[n-1]$, and then step (A) is executed.

* * * * *